US011958532B2

(12) United States Patent
Chemali et al.

(10) Patent No.: US 11,958,532 B2
(45) Date of Patent: Apr. 16, 2024

(54) DEVICE FOR PROTECTING POWER SUPPLY BATTERY OF MOTOR VEHICLE (71) Applicant: Nissan Motor Co., Ltd., Kanagawa (JP)

(72) Inventors: Habib Chemali, Colombes (FR); Yann Mariotte, Bondoufle (FR)

(73) Assignee: Nissan Motor Co., Ltd., Kanagawa (JP)

( * ) Notice: Subject to any disclaimer, the term of this patent is extended or adjusted under 35 U.S.C. 154(b) by 365 days.

(21) Appl. No.: 17/291,735

(22) PCT Filed: Nov. 5, 2019

(86) PCT No.: PCT/EP2019/080279
§ 371 (c)(1),
(2) Date: May 6, 2021

(87) PCT Pub. No.: WO2020/094662
PCT Pub. Date: May 14, 2020

(65) Prior Publication Data
US 2021/0387674 A1 Dec. 16, 2021

(30) Foreign Application Priority Data
Nov. 7, 2018 (FR) ...................................... 1860250

(51) Int. Cl.
*B62D 21/15* (2006.01)
*B60K 1/04* (2019.01)
(52) U.S. Cl.
CPC .............. *B62D 21/157* (2013.01); *B60K 1/04* (2013.01); *B60K 2001/0416* (2013.01)
(58) Field of Classification Search
CPC .............. B60K 1/04; B60K 2001/0416; B60K 2001/0438; B62D 21/157
See application file for complete search history.

(56) References Cited

U.S. PATENT DOCUMENTS 9,259,998 B1 * 2/2016 Leanza .................. B62D 25/20
9,517,687 B2 * 12/2016 Nakajima ................ B60K 1/04
(Continued)

FOREIGN PATENT DOCUMENTS

DE 102011120960 A1 4/2013
DE 102013006702 A1 10/2014
(Continued)

*Primary Examiner* — Katy M Ebner
(74) *Attorney, Agent, or Firm* — Osha Bergman Watanabe & Burton LLP (57) ABSTRACT A protection device for protection of a functional element of a motor vehicle against lateral shocks includes, in a single piece, a protection element and a shock absorber. A method of mounting a protection device in a motor vehicle with electric or hybrid drive including a power supply battery includes the following steps: supplying the power supply battery and at least one protection device. The at least one protection device is configured to protect a functional element of the motor vehicle against lateral shocks and includes, in a single piece, a protection element and a shock absorber, and the functional element comprises the power supply battery. The method also includes, on at least one of two left and right sides of the motor vehicle, fixing, removably, a first protection device to a corresponding lateral edge of the power supply battery and to an underframe of the motor vehicle, such that the protection element at least partly covers a bottom surface of the power supply battery, the shock absorber is arranged, in a longitudinal direction of the motor vehicle, between a front support element of a support of the power supply battery and a fixing of a rear end of the motor vehicle, and, in a transverse direction of the motor vehicle, against a lateral edge of the power supply battery.

19 Claims, 4 Drawing Sheets (56) References Cited

U.S. PATENT DOCUMENTS

| | | | |
|---|---|---|---|
| 9,997,753 B2 * | 6/2018 | Nomura | B60K 1/04 |
| 10,065,491 B1 * | 9/2018 | Syed | B60L 50/64 |
| 10,189,508 B2 * | 1/2019 | Dupper | B62D 25/2072 |
| 10,358,168 B2 * | 7/2019 | Atsumi | B62D 21/15 |
| 10,486,746 B2 * | 11/2019 | Kawabe | B60K 1/04 |
| 11,077,881 B2 * | 8/2021 | Matsuda | B62D 27/023 |
| 2008/0258506 A1 * | 10/2008 | Egawa | B62D 25/2036 |
| | | | 296/204 |
| 2010/0289295 A1 * | 11/2010 | Yoda | B60K 1/04 |
| | | | 296/187.03 |
| 2011/0011654 A1 * | 1/2011 | Kubota | B60L 50/64 |
| | | | 903/903 |
| 2014/0242447 A1 * | 8/2014 | Nomura | B60L 3/0046 |
| | | | 429/163 |
| 2015/0255764 A1 * | 9/2015 | Loo | H01M 50/249 |
| | | | 429/149 |
| 2016/0068195 A1 | 3/2016 | Hentrich et al. | |
| 2016/0257346 A1 * | 9/2016 | Wu | B60K 1/04 |
| 2017/0113731 A1 * | 4/2017 | Imura | B60K 1/04 |
| 2018/0312199 A1 * | 11/2018 | Kawase | B60K 1/04 |
| 2019/0359047 A1 * | 11/2019 | Tsuyuzaki | B60K 1/04 |

FOREIGN PATENT DOCUMENTS

| | | |
|---|---|---|
| EP | 2766247 A1 | 8/2014 |
| EP | 2767427 A1 | 8/2014 |
| EP | 2766247 B1 | 8/2018 |
| JP | 2013-018430 A | 1/2013 |
| JP | 2017-196952 A | 11/2017 |
| WO | 2013/053433 A1 | 4/2013 |

* cited by examiner

DEVICE FOR PROTECTING POWER SUPPLY BATTERY OF MOTOR VEHICLE

The invention relates to a protection device, notably intended to protect a power supply battery of a motor vehicle with electric or hybrid drive against lateral shocks. The invention relates also to a motor vehicle including such a protection device. The invention also relates to a method of mounting such a protection device in a motor vehicle.

Vehicles with electric or hybrid drive include a power supply battery for supplying electrical energy to the electric motor, notably a drive motor. Such a battery is usually positioned in the bottom part of the structure of the vehicle. The result thereof is that such a battery is exposed to external forces applied to the vehicle, notably in case of lateral shock, for example with objects such as a post or a sidewalk.

It seems important to be able to protect a power supply battery of a motor vehicle with electric or hybrid drive against external forces applied to the vehicle, notably in cases of lateral shock.

One solution consists in using protection elements made of plastic, arranged around the battery, and aligned with the bottom surface of the battery along a vertical axis z. In other words, these protection elements are arranged at the same height as the bottom surface of the battery.

Another solution consists in using a downward extension of sill rebates. The motor vehicles can include sills arranged laterally on each side of the vehicle, and corresponding to the lowest lateral parts of the bodywork of the vehicle. However, despite the presence of sills, the bottom surface of the battery can still be located at a distance closer to the ground than the bottom end of the sills. One solution for protecting the battery against lateral shocks then consists in increasing the dimension of the sills along a vertical axis z, such that the bottom end of the sills is located at a distance closer to the ground than the bottom surface of the battery.

However, these solutions do present drawbacks. In particular, in case of lateral shock, these solutions can lead to a perforation of the casing of the battery and of the battery module itself. The result thereof is a risk of short circuit and of fire.

The aim of the invention is to provide a protection device, notably intended to protect a power supply battery of a motor vehicle, that remedies the above drawbacks and that enhances the protection devices of the prior art. In particular, the invention makes it possible to produce a protection device which is simple to assemble in a vehicle which has a lower production and mounting cost, and which offers enhanced aerodynamic efficiency.

According to the invention, a protection device, intended to protect a functional element of a motor vehicle against lateral shocks, includes, in the form of a single piece, a protection element and a shock absorber.

The protection device can be configured to protect a power supply battery of a motor vehicle with electric or hybrid drive.

The shock absorber can be of crash-box type.

The protection element can take the form of a sheet, or plate, planar or non-planar, notably convex on the side of the top surface of the protection element.

The protection element can have a truncated rectangular form.

Advantageously, the bottom surface of the protection element, intended to face the ground, can include grooves.

The top portion of the shock absorber can be concave on the side opposite that facing the top surface of the protection element.

The shock absorber can include a deformable material, for example chosen from the group including a metallic material, notably an aluminum alloy, a plastic material and a composite material.

The protection element includes, for example, a material chosen from the group including a metallic material, notably an aluminum alloy, a plastic material and a composite material.

The protection element and the shock absorber can be made of one and the same material.

The protection element has, for example, a thickness of between 2 mm and 5 mm.

The protection element can include, along a substantially vertical axis, an internal portion of a first level, an inclined intermediate portion from the first level to a second level and an external portion of the second level, said internal portion being intended to at least partly face a bottom surface of the battery, and said external portion being intended to at least partly face the underframe of a vehicle.

The protection element can include at least one first fixing point, for example two first fixing points, intended for the fixing of the protection device to a battery, and at least one second fixing point, for example four second fixing points, intended for the fixing of the protection device to an underframe of a motor vehicle.

The invention relates also to a motor vehicle with electric or hybrid drive, including a power supply battery and a protection device as defined previously, in which the protection element at least partly covers the bottom surface of the battery, such that the protection device is closer to the ground than the bottom surface of the battery.

The protection element can be fixed, removably, to a support of the battery and to the underframe of the vehicle.

The shock absorber of the protection device can be arranged, in the longitudinal direction of the vehicle, between a front support element of the battery support and a fixing of the rear end of the vehicle, and, in the transverse direction of the vehicle, against a lateral edge of the battery.

The invention relates finally to a method of mounting a protection device as defined previously in a motor vehicle with electric or hybrid drive including a power supply battery, including the following steps:
  supplying a battery and at least one protection device; and
  on at least one of the two right and left sides of the vehicle,
    fixing, removably, a first protection device to the corresponding lateral edge of the battery and to the underframe of the vehicle, such that the protection element at least partly covers the bottom surface of the battery, the shock absorber being, for example, arranged, in the longitudinal direction of the vehicle, between a front support element of a support of the battery and a fixing of the rear end, and, in the transverse direction of the vehicle, against the lateral edge of the battery.

The attached drawing represents, by way of example, an embodiment of a protection device according to the invention and a mode of execution of a mounting method according to the invention.

Figure 1:
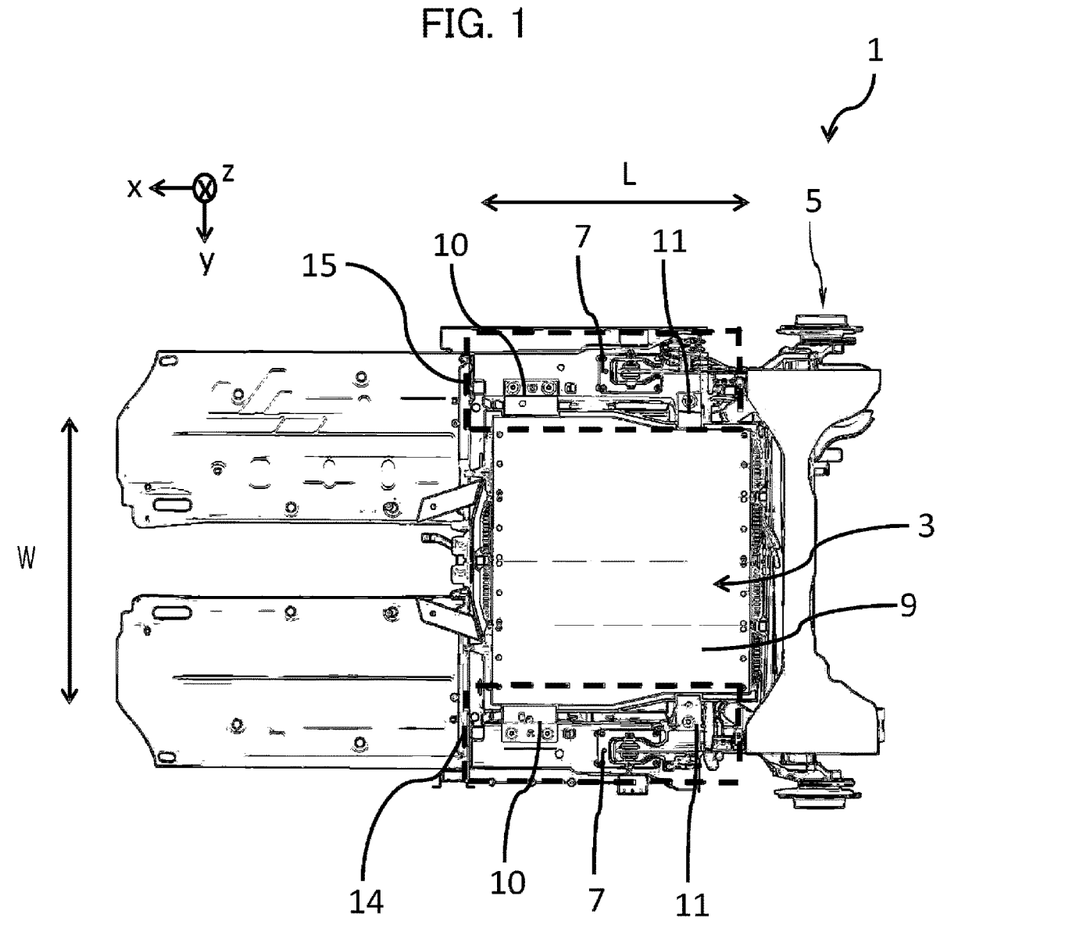
FIG. 1 is a view from below representing, partially in the longitudinal direction, a motor vehicle including a battery supplying a drive motor of the vehicle.

FIG. 1 is a view from below partially representing a motor vehicle 1 with electric or hybrid drive.

The axis x corresponds to the longitudinal direction of the vehicle 1. The axis x is oriented from the rear (or upstream) to the front (or downstream) of the vehicle 1. The axis x corresponds to the direction in which the vehicle moves usually in a straight line. The axis y corresponds to the transverse direction of the vehicle 1. The axis y is oriented from the left side to the right side of the vehicle 1. The axis z is a substantially vertical axis, oriented upward, from the bottom part to the top part of the vehicle 1.

The motor vehicle 1 includes a battery module 3. The battery module 3 notably includes a power supply battery, intended to supply electrical energy to an electric motor, notably a traction or drive motor, of the vehicle 1. The battery module 3 is surrounded by an enclosing housing or casing.

Hereinafter in the description, "battery" is understood to mean a battery module including a set of elements including a power supply battery.

The battery 3 is for example arranged forward of the rear end 5 of the vehicle 1 in the longitudinal direction x. The bottom surface 9 of the battery 3 is intended to be arranged substantially horizontally, at right angles to the vertical axis z. The battery 3 is arranged in the bottom part of understructure of the chassis of the vehicle 1. The battery 3 is placed on the chassis of the vehicle 1 via a support called "battery support". The battery support includes a front support element 10 and a rear support element 11 on each of the left and right sides of the battery 3. The battery 3 is for example fixed, removably, to the rear end 5 by a fixing 7 situated on each left and right side of the battery 3.

"Chassis" of the vehicle is understood to mean a structure supporting the functional elements of the vehicle. "Body shell" of the vehicle is understood to mean the bodywork of the vehicle. In the case of a motor vehicle including a chassis-cowl, the chassis is incorporated in the bodywork and the terms "body shell" and "chassis" are therefore equivalent. "Underframe" or "rocker panel" of the vehicle are understood to mean a portion of the bodywork which is situated in the low lateral parts of the vehicle, closest to the ground, between the wheels.

The bottom surface 9 of the battery 3 has a length L according to the longitudinal direction x and a width W according to the transverse direction y. The length L of the bottom surface 9 of the battery is for example between 300 mm and 2 cm. The width W of the bottom surface 9 of the battery is for example between 500 mm and 1.5 cm.

The invention proposes a protection device against external forces applied to the vehicle, notably in cases of lateral shock. Such a protection device is notably intended to protect a power supply battery of a motor vehicle of the type of that of FIG. 1.

"Lateral shock" is understood to be an impact with the right side or the left side of the vehicle 1, corresponding to an external force applied to the vehicle at least in the transverse direction y. A lateral shock is for example likely to occur with an object outside the vehicle such as a post or a sidewalk.

Figure 2:
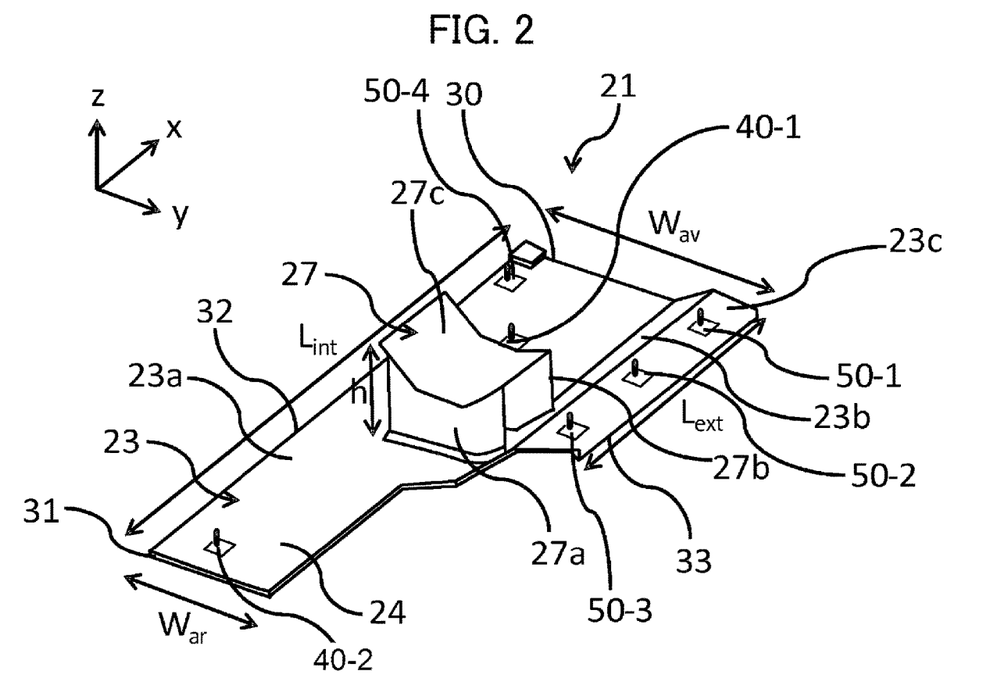
FIG. 2 is a perspective view representing an embodiment of a protection device, intended to be mounted on the right side of a vehicle.
Figure 3:
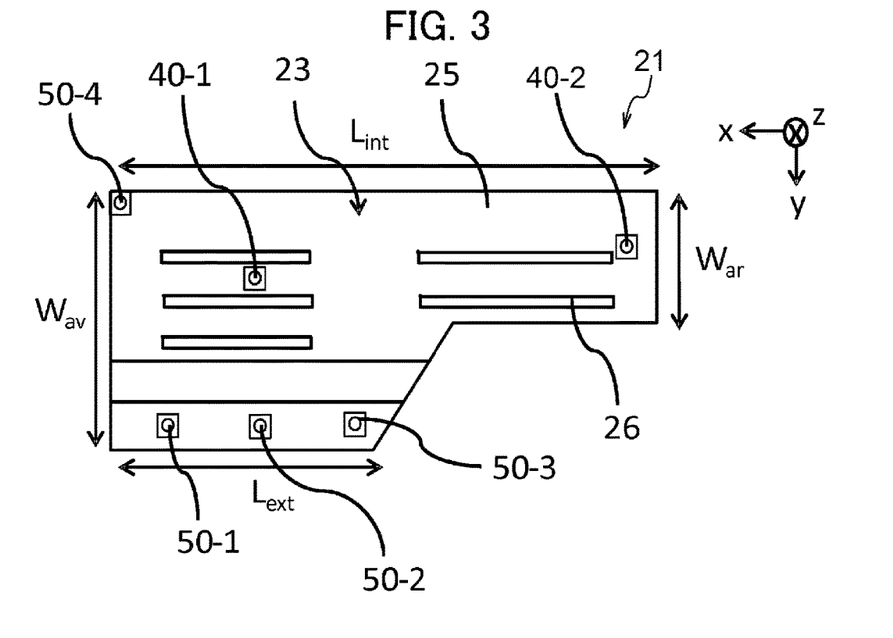
FIG. 3 is a view from below representing an embodiment of a protection device, intended to be mounted on the right side of a vehicle.

An embodiment of a protection device 21 is described hereinbelow with reference to FIGS. 2 and 3, in the case of a protection device 21 intended to be arranged on the right side of the vehicle, to protect the battery notably in the case of a lateral shock on the right side of the vehicle.

Obviously, the invention also proposes a protection device 21 intended to be arranged on the left side of the vehicle, to protect the battery notably in the case of a lateral shock on the left side. The protection device 21 intended to be arranged on the left side of the vehicle is symmetrical to the protection device 21 of FIGS. 2 and 3, with respect to a vertical plane (x, z) passing through the internal end 32 of the protection device 21.

Preferably, a protection device 21 is arranged on each side of the vehicle. The location of a protection device 21 on each side of the vehicle is represented by dotted lines 14 on the right side and by dotted lines 15 on the left side of the vehicle in FIG. 1.

The protection device 21 includes, in the form of a single piece, a protection element, or protector, 23 and a shock absorber 27.

The protection element 23 can take the form of a sheet, or plate, for example metallic. The protection element 23 is intended to act as a physical barrier or shield against the lateral shocks for the battery.

The protection element 23 includes a top surface 24 and a bottom surface 25 that are substantially parallel to one another. The top surface 24 of the protection element 23 is intended to be arranged at least partially facing the bottom surface 9 of the battery 3. The bottom surface 25 of the protection element 23 is intended to face the ground. The thickness of the protection element 23 is notably chosen so as to ensure a good flexural rigidity of the protection element 23. The thickness of the protection element 23 is understood to mean the dimension of the protection element 23 in a direction substantially at right angles to the top surface 24 and bottom surface 25.

The top surface 24 and the bottom surface 25 of the protection element 23 are intended to be oriented substantially at right angles to the vertical axis z. The term length is used to denote the dimension of the protection element 23 in the longitudinal direction x and the term width is used to denote the dimension of the protection element 23 in the transverse direction y.

The protection element 23 includes, for example, a metallic material, notably an aluminum alloy, or a plastic material or a composite material. The thickness of the protection element 23 is for example between 2 mm and 5 mm.

Advantageously, the protection element 23 takes the form of a sheet, or plate, non-planar and folded. On the side of the top surface 24 of the protection element 23, the protection element 23 can take the form of a convex sheet or plate.

Advantageously, the protection element 23 can include portions 23a, 23b, 23c of different levels along the axis z, arranged along its width, as will be described in more detail hereinbelow.

The top surface 24 of the protection element 23 is intended to be arranged at least partially facing the bottom surface 9 of the battery 3 and also at least partially facing the underframe 60 of the vehicle.

The protection element 23 is intended to cover at least the lateral edge of the bottom surface 9 of the battery, and surround the lateral edge of the battery 3.

Preferably, the form of the surface of the protection element 23, notably folded, will be chosen so as to match the differences in level or height in the vertical direction z between the bottom surface 9 of the battery 3 and the different parts of the underframe 60 of the vehicle to which the protection element 23 is intended to be fixed.

By virtue of its folded form, the protection element 23 covers not only the lateral edge of the bottom surface 9 of the battery, but also surrounds the lateral edge of the battery 3 over at least a part of its height. After assembly on the battery 3 and the underframe 60 of the vehicle, the protection element 23 thus acts as a physical barrier against lateral shocks for the battery.

Advantageously, the protection element 23 has a truncated rectangular form. The result thereof is that the protection element 23 can be placed in the vehicle without covering the fixing 7 between the battery 3 and the rear end 5 of the vehicle, or the rear end 5 of the vehicle.

Advantageously, the bottom surface 25 of the protection element 23 includes grooves 26. These grooves make it possible to optimize the rigidity of the protection element 23 and the acoustic and vibratory behavior (NVH, the acronym for "Noise, Vibration and Harshness") of the vehicle.

For example, the grooves 26 can extend in the direction of the protection element 23 intended to be oriented in the longitudinal direction x, over all or part of the length of the protection element 23. Several grooves 26 that are parallel to one another and oriented in the longitudinal direction x can be distributed over the bottom surface 25 of the protection element 23, along the transverse direction y. In the case where the grooves 26 extend only over a part of the length of the protection element 23, several grooves 26 can be arranged side-by-side along the longitudinal direction x, at a distance from one another.

A shock absorber 27 extends from the top surface 24 of the protection element 23. The shock absorber 27 is intended to absorb all or part of the energy resulting from a shock, notably by virtue of its deformation. Advantageously, the shock absorber 27 is made of a deformable material, for example a metallic material or a plastic material or a composite material. The shock absorber 27 is for example of crash-box type. The protection element 23 acts notably as physical support for the shock absorber 27, in addition to its function of physical barrier against shocks.

Simulations have shown that the protection device 21, including a protection element 23 combined with a shock absorber 27, makes it possible to absorb the energy resulting from a lateral shock. The deformation, even the breaking, of the protection device 21, makes it possible to guarantee an optimal integrity of the battery 3 in the event of a shock.

The shock absorber 27 includes, for example, a metallic material, notably an aluminum alloy, or a plastic material or a composite material.

The protection element 23 and the shock absorber 27 can for example be made of one and the same material. According to a variant, the protection element 23 and the shock absorber 27 can be made of different materials.

For example, the protection element 23 and the shock absorber 27 are co-incorporated in the form of a single piece. The protection device 21 therefore takes the form of a single piece. The result thereof is a reduction in the cost of the protection device and of the mounting thereof in a motor vehicle. This also results in a mounting that is simple to implement. The co-incorporation of the shock absorber 27 and of the protection element 23 can be produced by welding in the case where the shock absorber 27 and the protection element 23 are made of metallic or plastic material.

The shock absorber 27 includes, for example, a first lateral portion 27a, a second lateral portion 27b and a top portion 27c. The first and second lateral portions 27a, 27b extend from the top surface 24 of the protection element 23, substantially at right angles to said surface 24. The top portion 27c is in contact with the ends of the first and second lateral portions 27a, 27b opposite those in contact with the top surface 24 of the protection element 23. The top portion 27c extends substantially at right angles to the first and second lateral portions 27a, 27b.

Advantageously, the top portion 27c of the shock absorber 27 is not planar. The top portion 27c of the shock absorber 27 can have a concave form, on the side opposite that facing the top surface 24 of the protection element 23. This makes it possible to optimize the absorption of the energy resulting from a shock.

The shock absorber 27 is arranged on the top surface 24 of the protection element 23 in a location that is chosen such that, after assembly, the shock absorber 27 is located, in the longitudinal direction x, between the battery 3 and the rear end 5, notably between the battery support 10 and the fixing 7 of the rear end 5, and, in the transverse direction y, against the lateral edge of the battery 3.

The height h of the shock absorber 27 will for example be chosen so as to be substantially equal to the thickness of the battery 3. "Height" h of the shock absorber 27 is understood to mean the maximum dimension of the portions 27a, 27b in the direction at right angles to the top surface 24 of the protection element 23.

According to an exemplary embodiment, the protection element 23 includes at least one first fixing point 40-1, 40-2 intended for the fixing of the protection device 21 to a battery 3, and at least one second fixing point 50-1, 50-2, 50-3, 50-4 intended for the fixing of the protection device 21 to an underframe 60 of a motor vehicle.

The protection element 23 includes, for example, two first fixing points 40-1, 40-2 intended for the fixing of the protection device 21 to a battery 3, and four second fixing points 50-1, 50-2, 50-3, 50-4 intended for the fixing of the protection device 21 to an underframe 60 of a motor vehicle.

As a variant, the protection element 23 will be able to include a different number of first fixing points and of second fixing points.

As a variant, other means for fixing the protection element 23 to the battery 3 and/or the underframe 60 can be envisaged, such as bonding or welding.

The protection element 23 will also be able to have other forms. For example, the form of the protection element 23 can be rectangular or square.

The form of the protection element 23 will be chosen so as to cover at least a part of the bottom surface 9 of the battery 3 after arrangement with the battery, in the longitudinal direction x and in the transverse direction y.

One advantage of a protection device 21 of the type of that described above lies in the fact that it makes it possible to protect a battery of a motor vehicle against lateral shocks.

Another advantage of a protection device 21 of the type of that described above lies in the fact that it makes it possible to obtain enhanced underframe aerodynamic efficiencies.

Another advantage of a protection device 21 of the type of that described above lies in the reduced cost of production and of mounting of the protection device, the protection device 21 including a protection element 23 and a shock absorber 27 in the form of a single piece. The result thereof is also a mounting that is simpler to implement for such a protection device.

An exemplary embodiment of the protection element 23 is described in more detail hereinbelow in the case of a protection element 23 suitable for fixing to the right lateral part of the underframe of the vehicle.

The protection element 23 includes, for example, a first portion 23a, a second portion 23b and a third portion 23c.

The first portion 23a of the protection element 23 is adapted to be arranged substantially horizontally, and extends according to a first level z0 along the vertical axis z. The first portion 23a of the protection element 23, called internal portion, is intended to be arranged at least partially facing, or at least partially in contact with, the bottom surface 9 of the battery 3. After assembly of the protection device 21 with the battery 3, the first portion 23a is the portion of the protection element 23 closest to the center of the vehicle in the transverse direction y, in other words the portion of the protection element 23 innermost to the structure of the vehicle. The portion 23a of the protection element 23 is intended to be the lowest portion of the protection element 23 after assembly.

The second portion 23b of the protection element 23 is inclined with respect to the first portion 23a, and extends from the first level z0 to a second level z1, higher than the level z0. The second portion 23b, called intermediate portion of the protection element 23, is arranged between the first portion 23a and the third portion 23c.

The third portion 23c of the protection element 23 is substantially horizontal, and extends along the second level z1. The third portion 23c of the protection element 23, called external portion, is intended to be arranged at least partially facing, or at least partially in contact with, the underframe 60 of the vehicle. After assembly of the protection device 21 with the battery 3 and fixing to the underframe 60 of the vehicle, the third portion 23c is the portion of the protection element 23 outermost to the structure of the vehicle, in other words closest to the right lateral edge of the vehicle. The portion 23c of the protection element 23 is intended to be the highest portion of the protection element 23 after assembly.

Advantageously, the protection element 23 has a width that is variable in the direction intended to be oriented in the longitudinal direction x of the vehicle. The end 30 of the protection element 23, called front end, intended to be arranged furthest forward in the vehicle, can have a width $W_{av}$ greater than the width $W_{ar}$ of the end 31 of the protection element 23, called rear end, intended to be arranged rearmost in the vehicle. For example, the width $W_{av}$ of the front end 30 of the protection element 23 is of the order of two times the width $W_{ar}$ of the rear end 31 of the protection element 23.

To give an example of the dimensions, the width $W_{av}$ is for example between 200 mm and 400 mm, and the width $W_{ar}$ is for example between 100 mm and 200 mm.

Advantageously, the protection element 23 has a length that is variable in the direction intended to be oriented in the transverse direction y. The end 32 of the protection element 23, called internal end, intended to be arranged closest to the center of the vehicle, can have a length $L_{int}$ greater than the length $L_{ext}$ of the end 33 of the protection element 23, called external end, intended to be arranged closest to the right lateral edge of the vehicle. For example, the length $L_{int}$ of the internal end 32 of the protection element 23 is of the order of two times the length $L_{ext}$ of the external end 33 of the protection element 23.

To give an example of dimensions, the length $L_{int}$ is for example between 700 mm and 900 mm, and the length $L_{ext}$ is for example between 300 mm and 500 mm.

Figure 4:
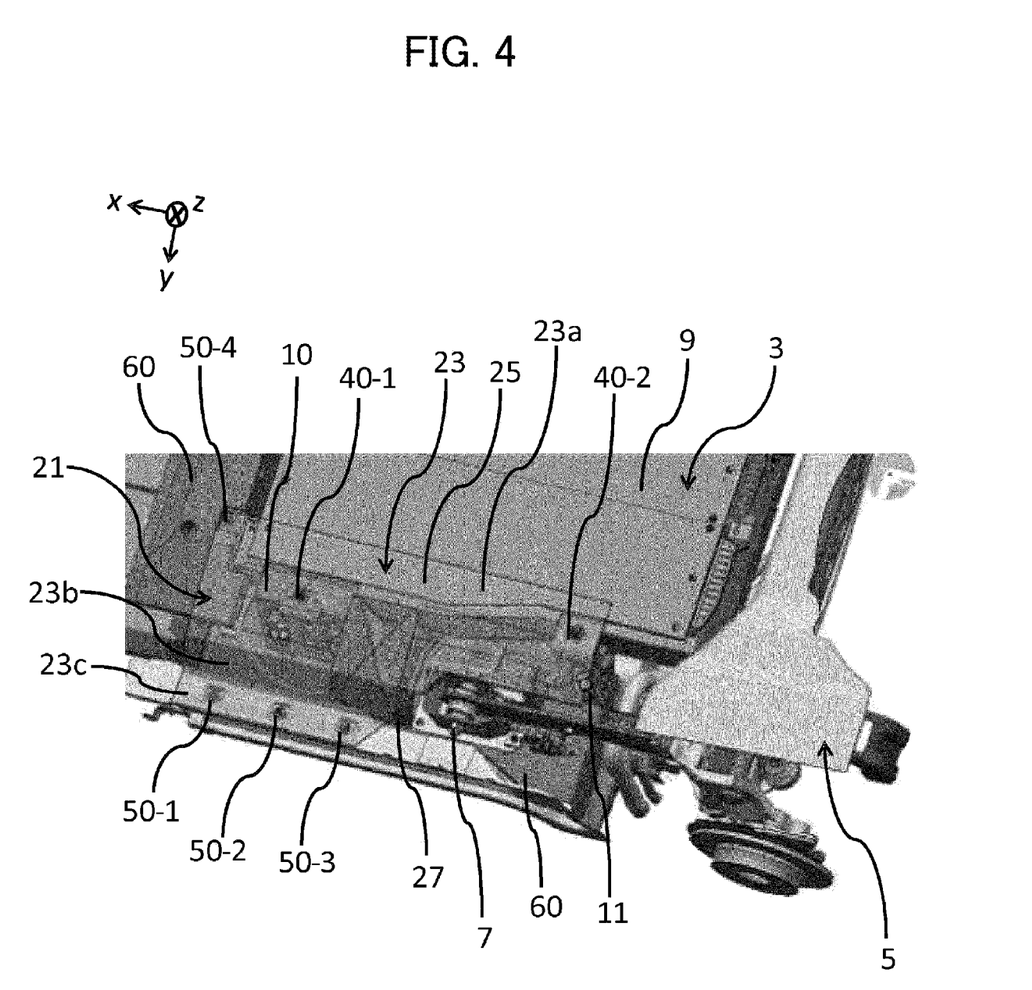
FIG. 4 is a partial view from below representing an arrangement of a power supply battery and of an embodiment of a protection device in a motor vehicle.
Figure 5:
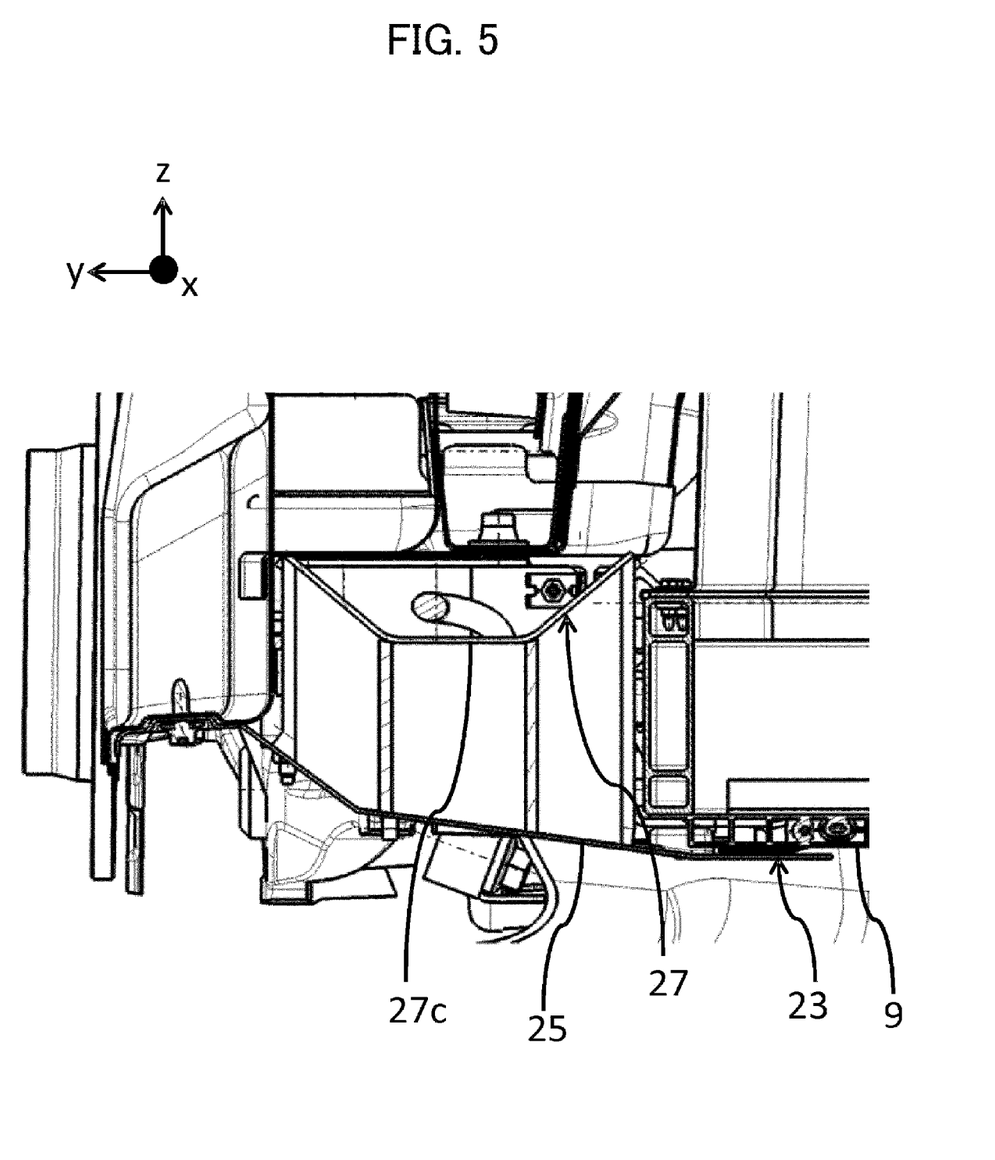
FIG. 5 is a partial view in cross section through a vertical plane representing an arrangement of a power supply battery and an embodiment of a protection device in a motor vehicle.

An example of the arrangement in a motor vehicle 1 of a power supply battery 3 and of a protection device 21 such as that described in relation to FIGS. 2 and 3, including a protection element 23 and a shock absorber 27 co-incorporated in the form of a single piece, is described hereinbelow in relation to FIGS. 4 and 5. FIGS. 4 and 5 correspond to the case of a protection device 21 arranged on the right side of the vehicle, to protect the battery notably in the case of a lateral shock on the right side.

The top surface 24 of the protection element 23 of the protection device 21 partially faces the bottom surface 9 of the battery 3. The bottom surface 25 of the protection element 23 of the protection device 21 faces the ground. The internal portion 23a of the protection element 23 is arranged at least partially facing, or in contact with, the bottom surface 9 of the battery 3. The external portion 23c of the protection element 23 is arranged at least partially facing, or in contact with, the underframe 60 of the vehicle. The internal portion 23a of the protection element 23 can also be arranged at least partially facing, or in contact with, a part of the underframe 60 arranged forward of the battery 3. In the longitudinal direction x of the vehicle, the shock absorber 27 of the protection device 21 is for example arranged between the front support element 10 of the battery support and the right fixing 7 of the rear end 5, and, in the transverse direction y, the shock absorber 27 is for example arranged against the right lateral edge of the battery 3.

In the case of a motor vehicle including a chassis-cowl, the chassis is incorporated in the bodywork. The third portion 23c of the protection element 23 is then intended to be arranged at least partially facing, or at least partially in contact with, the understructure of the chassis-cowl or chassis of the vehicle.

The arrangement can include fixing elements ensuring a removable fixing of the protection device 21 to the battery 3 and to the underframe 60. These fixing elements are configured to exert a force bringing the protection device 21 closer to the battery 3 and to the underframe 60. These fixing elements can be of any kind, for example clamping screws.

The internal portion 23a of the protection element 23 of the protection device 21 is fixed to the battery 3 by fixing elements arranged at the first fixing points 40-1, 40-2. For example, the protection device 21 is fixed to the front support element 10 of the battery support at the first fixing point 40-1, and fixed to the rear support element 11 of the battery support at the first fixing point 40-2.

The external portion 23c of the protection element 23 of the protection device 21 is fixed to the underframe 60 by fixing elements arranged at the second fixing points 50-1, 50-2, 50-3. For example, the protection device 21 is fixed to a right lateral part of the underframe 60 at three second fixing points 50-1, 50-2, 50-3.

Advantageously, the internal portion 23a of the protection element 23 of the protection device 21 is also fixed to the underframe 60 by a fixing element arranged at the second fixing point 50-4. For example, the protection device 21 is fixed to a part of the underframe 60 arranged forward of the battery 3 at the second fixing point 50-4. The result thereof is an enhanced fixing of the protection device 21 to the underframe 60 of the vehicle.

By virtue of its positioning, on the one hand, on the lateral edge of the bottom surface 9 of the battery 3 at the height z0 and, on the other hand, on the underframe 60 at the height z1, the protection element 23 of the protection device 21 surrounds the bottom part of the lateral edge of the battery. The protection element 23 thus ensures the function of physical barrier or shield against lateral shocks.

The protection element 23 at least partly covers the bottom surface 9 of the battery 3. The protection device 21 is arranged closer to the ground than the battery 3, at the internal portion 23a of the protection element 23. The protection element 23 is thus the lowest element of the vehicle, and not the battery 3. The protection element 23 thus ensures the function of physical barrier or shield against lateral shocks.

One mode of execution of a method of mounting a protection device 21, including a protection element 23 and a shock absorber 27 co-incorporated in the form of a single piece, and a power supply battery 3 in a vehicle 1, is described hereinbelow.

The battery is mounted removably in the vehicle 1, for example in the central part of the vehicle 1, notably forward of the rear end 5, underneath.

The mounting of the protection device 21 and of the battery 3 in the vehicle 1 includes the following steps:
- supplying a battery 3 and at least one protection device 21 intended to protect the battery 3 against lateral shocks, the at least one protection device 21 including a protection element 23 and a shock absorber 27 co-incorporated in the form of a single piece;
- on the right side of the vehicle, fixing, removably, a first protection device 21 to the right lateral edge of the battery 3 and to the underframe 60, such that the protection element 23 at least partly covers the bottom surface 9 of the battery, the shock absorber 27 being for example arranged between the right front support element 10 of the battery support and the right fixing 7 of the rear end 5 in the longitudinal direction x of the vehicle, and the shock absorber 27 being for example arranged against the right lateral edge of the battery 3 in the transverse direction y;
- and/or on the left of the vehicle, fixing, removably, a second protection device 21 to the left lateral edge of the battery 3 and to the underframe 60, such that the protection element 23 at least partly covers the bottom surface 9 of the battery, the shock absorber 27 being for example arranged between the left front support element 10 of the battery support and the left fixing 7 of the rear end 5 in the longitudinal direction x of the vehicle, and the shock absorber 27 being for example arranged against the left lateral edge of the battery 3 in the transverse direction y.

The protection element 23 of the protection device 21 can be fixed to the battery 3 by at least one fixing element inserted at the at least one first fixing point 40-1, 40-2. The protection element 23 is for example fixed to the front 10 and rear 11 support elements of the battery support, respectively at the first fixing points 40-1 and 40-2.

The protection element 23 of the protection device 21 can be fixed to the underframe 60 by at least one fixing element inserted at the at least one second fixing points 50-1, 50-2, 50-3, 50-4. The protection element 23 is for example fixed to a lateral part of the underframe 60 at the three second fixing points 50-1, 50-2, 50-3, and to a part of the underframe 60 arranged forward of the battery 3 at the second fixing point 50-4.

One advantage of a method of mounting a protection device 21 of the type of that described above is linked to the fact that the protection device 21 includes a protection element 23 and a shock absorber 27 in the form of a single piece. The result thereof is a mounting method that is simpler to implement and that has a reduced cost.

A protection device 21 has been described above in the case of a battery intended to supply an electric traction motor of a vehicle. Such a protection device 21 will also be able to be used in the case of a battery intended to supply other types of electric motors.

A protection device 21 has been described above that is notably intended for a power supply battery 3 of a motor vehicle.

One advantage of such a protection device 21 lies in the fact that it can be used to protect other functional and/or structural elements of a motor vehicle against lateral shocks, for example an electric circuit, notably a breaking circuit, or a fuel circuit in the case of vehicles with hybrid drive or a low voltage and/or high voltage electric circuit or a cooling circuit of a battery.

A protection device 21 has been described that is intended to protect a battery against lateral shocks, that can be arranged on the right and/or on the left of a vehicle.

Instead of two protection devices 21 arranged on either side of a vehicle, a single protection device 21 could be provided, including, for example, one protection element 23 intended to cover not only the right and left lateral parts of the bottom surface 9 of the battery 3, but also the central portion of the bottom surface 9 of the battery 3. Such a protection device 21 can be intended to cover the bottom surface 9 of the battery 3 over all or part of its width W. Such a protection element 23 will for example be truncated on both right and left sides, so as not to cover the right rear end of the vehicle or the left rear end. Such a protection device 21 includes, in the form of a single piece, a protection element 23 and a first and a second shock absorbers 27, arranged respectively on the right side and on the left side.

The invention claimed is:

1. A protection device for protection of a functional element of a motor vehicle against lateral shocks, the protection device comprising, in a single piece, a protection element and a shock absorber,
   wherein the shock absorber includes a first lateral portion, a second lateral portion, and a top portion,
   wherein the first lateral portion and the second lateral portion extend from a top surface of the protection element substantially at right angles to the top surface,
   wherein the top portion is in contact with ends of the first lateral portion and the second lateral portion opposite ends of the first lateral portion and the second lateral portion in contact with the top surface of the protection element,
   wherein the top portion extends substantially at right angles to the first lateral portion and the second lateral portion,
   wherein the top portion of the shock absorber is concave on a side opposite that facing the top surface of the protection element, and
   wherein a height of the shock absorber varies such that a vertex of the top portion has a smallest height and outer edges of the top portion have a largest height.

2. The protection device as claimed in claim 1, configured to protect a power supply battery of the motor vehicle with electric or hybrid drive.

3. The protection device as claimed in claim 1, wherein the shock absorber is of a crash-box type.

4. The protection device as claimed in claim 1, wherein the protection element has a shape of a sheet or plate, planar or non-planar, and convex on a side of a top surface of the protection element.

5. The protection device as claimed in claim 1, wherein the protection element has a truncated rectangular shape.

6. The protection device as claimed in claim 1, wherein a bottom surface of the protection element faces the ground and comprises grooves.

7. The protection device as claimed in claim 1, wherein the shock absorber comprises a deformable material.

8. The protection device as claimed in claim 1, wherein the protection element comprises a material selected from the group consisting of a metallic material, an aluminum alloy, a plastic material, and a composite material.

9. The protection device as claimed in claim 1, wherein the protection element and the shock absorber are made of one and a same material.

10. The protection device as claimed in claim 1, wherein the protection element has a thickness of between 2 mm and 5 mm.

11. The protection device as claimed in claim 2, wherein the protection element comprises, along a substantially vertical axis, an internal portion of a first level, an inclined intermediate portion from the first level to a second level, and an external portion of the second level, the internal portion at least partly facing a bottom surface of the power supply battery, and the external portion at least partly facing an underframe of the motor vehicle.

12. The protection device as claimed in claim 2, wherein the protection element comprises at least one first fixing point for fixing the protection device onto the power supply battery, and at least one second fixing point for fixing the protection device to an underframe of the motor vehicle.

13. A motor vehicle with electric or hybrid drive, comprising a protection device configured to protect a functional element of the motor vehicle against lateral shocks and comprising, in a single piece, a protection element and a shock absorber,
wherein the functional element comprises a power supply battery,
wherein the protection element at least partly covers a bottom surface of the power supply battery with the protection device being closer to the ground than the bottom surface of the power supply battery,
wherein the shock absorber includes a first lateral portion, a second lateral portion, and a top portion,
wherein the first lateral portion and the second lateral portion extend from a top surface of the protection element substantially at right angles to the top surface,
wherein the top portion is in contact with ends of the first lateral portion and the second lateral portion opposite ends of the first lateral portion and the second lateral portion in contact with the top surface of the protection element,
wherein the top portion extends substantially at right angles to the first lateral portion and the second lateral portion,
wherein the top portion of the shock absorber is concave on a side opposite that facing the top surface of the protection element, and
wherein a height of the shock absorber varies such that a vertex of the top portion has a smallest height and outer edges of the top portion have a largest height.

14. The motor vehicle as claimed in claim 13, wherein the protection element is fixed, removably, to a support of the power supply battery and to an underframe of the motor vehicle.

15. The motor vehicle as claimed in claim 14, wherein the shock absorber of the protection device is arranged, in a longitudinal direction of the motor vehicle, between a front support element of the support of the power supply battery and a fixing portion of a rear end of the motor vehicle, and, in a transverse direction of the motor vehicle, against a lateral edge of the power supply battery.

16. A method of mounting a protection device in a motor vehicle with electric or hybrid drive comprising a power supply battery, the method comprising:
supplying the power supply battery and at least one protection device, wherein the at least one protection device is configured to protect a functional element of the motor vehicle against lateral shocks and comprises, in a single piece, a protection element and a shock absorber, and the functional element comprises the power supply battery; and
on at least one of two left and right sides of the motor vehicle, fixing, removably, a first protection device to a corresponding lateral edge of the power supply battery and to an underframe of the motor vehicle, such that the protection element at least partly covers a bottom surface of the power supply battery, the shock absorber is arranged, in a longitudinal direction of the motor vehicle, between a front support element of a support of the power supply battery and a fixing portion of a rear end of the motor vehicle, and, in a transverse direction of the motor vehicle, against a lateral edge of the power supply battery,
wherein the shock absorber includes a first lateral portion, a second lateral portion, and a top portion,
wherein the first lateral portion and the second lateral portion extend from a top surface of the protection element substantially at right angles to the top surface,
wherein the top portion is in contact with ends of the first lateral portion and the second lateral portion opposite ends of the first lateral portion and the second lateral portion in contact with the top surface of the protection element,
wherein the top portion extends substantially at right angles to the first lateral portion and the second lateral portion,
wherein the top portion of the shock absorber is concave on a side opposite that facing the top surface of the protection element, and
wherein a height of the shock absorber varies such that a vertex of the top portion has a smallest height and outer edges of the top portion have a largest height.

17. The protection device as claimed in claim 7, wherein the deformable material is selected from the group consisting of a metallic material, an aluminum alloy, a plastic material, and a composite material.

18. The protection device as claimed in claim 12, wherein the at least one first fixing point comprises two first fixing points, and
the at least one second fixing point comprises four second fixing points.

19. The protection device as claimed in claim 11, wherein the shock absorber is provided on the internal portion of the protection element.

* * * * *